(12) United States Patent
Yasuda

(10) Patent No.: US 9,501,260 B2
(45) Date of Patent: *Nov. 22, 2016

(54) HIGH SPEED AND LOW POWER CIRCUIT STRUCTURE FOR BARREL SHIFTER

(71) Applicant: International Business Machines Corporation, Armonk, NY (US)

(72) Inventor: Takeo Yasuda, Nara (JP)

(73) Assignee: International Business Machines Corporation, Armonk, NY (US)

( * ) Notice: Subject to any disclaimer, the term of this patent is extended or adjusted under 35 U.S.C. 154(b) by 406 days.

This patent is subject to a terminal disclaimer.

(21) Appl. No.: 14/094,794

(22) Filed: Dec. 3, 2013

(65) Prior Publication Data

US 2014/0089363 A1 Mar. 27, 2014

Related U.S. Application Data

(63) Continuation of application No. 13/538,001, filed on Jun. 29, 2012, now Pat. No. 9,021,000.

(51) Int. Cl.
*G06F 5/01* (2006.01)

(52) U.S. Cl.
CPC .................... *G06F 5/015* (2013.01)

(58) Field of Classification Search
CPC ....................................... G06F 5/015
See application file for complete search history.

(56) References Cited

U.S. PATENT DOCUMENTS

| 4,785,393 A | 11/1988 | Chu et al. |
| 4,825,400 A | 4/1989 | Simoncic et al. |
| 5,124,583 A | 6/1992 | Hatano et al. |
| 5,272,654 A | 12/1993 | Nix |
| 5,555,202 A | 9/1996 | Chu |

(Continued)

FOREIGN PATENT DOCUMENTS

| JP | 61-032139 A | 2/1986 |
| JP | 01-161433 A | 6/1989 |

(Continued)

OTHER PUBLICATIONS

Wikipedia, Signed Number Representations, Feb. 23, 2010, pp. 1-5.*

(Continued)

*Primary Examiner* — Andrew Caldwell
*Assistant Examiner* — Calvin M Brien
(74) *Attorney, Agent, or Firm* — Thomas E. Tyson; Jack V. Musgrove

(57) ABSTRACT

A barrel shifter uses a sign magnitude to 2's complement converter to generate decoder signals for its cascaded multiplexer selectors. The sign input receives the shift direction and the magnitude input receives the shift amount. The sign magnitude to 2's complement converter computes an output result as a 2's complement of the shift amount using the shift direction as a sign input, assigns a first portion (most significant bit half) of the output result to a first decoder signal, and assigns a second portion (least significant bit half) of the output result to a second decoder signal. The encoding scheme using a sign magnitude to 2's complement converter allows the decoder circuits to be relatively simple, for example, 3-to-8 decoders for a 64-bit operand value rather than the 4-to-9 decoder required in a conventional barrel shifter, leading to faster operation, less area, and reduced power consumption.

5 Claims, 7 Drawing Sheets

(56) References Cited

U.S. PATENT DOCUMENTS 7,395,294 B1 7/2008 Metzgen
7,415,542 B2 8/2008 Hennedy et al.

FOREIGN PATENT DOCUMENTS

| JP | 02-077933 A | 3/1990 |
| JP | 02-178831 A | 7/1990 |
| JP | 04-021025 A | 1/1992 |
| JP | 04-245323 A | 9/1992 |
| JP | 08-161149 A | 6/1996 |
| JP | 09-282142 A | 10/1997 |
| JP | 2010-140192 A | 6/2010 |

OTHER PUBLICATIONS

Fairchild Semiconductor Corporation, NCSZ27 Tinylogic (R) UHS 3-Input NOR Gate, Sep. 2004.

* cited by examiner (i = 1)
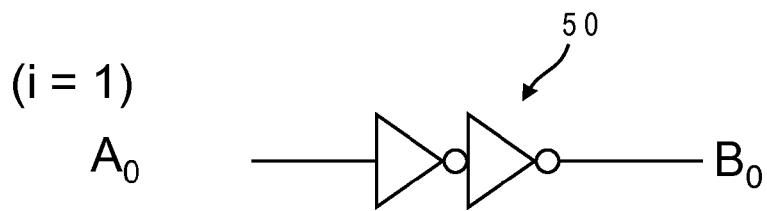
(i = 2)
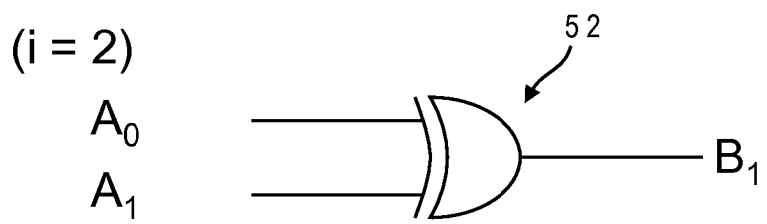
(i = 3, 4, ... n)
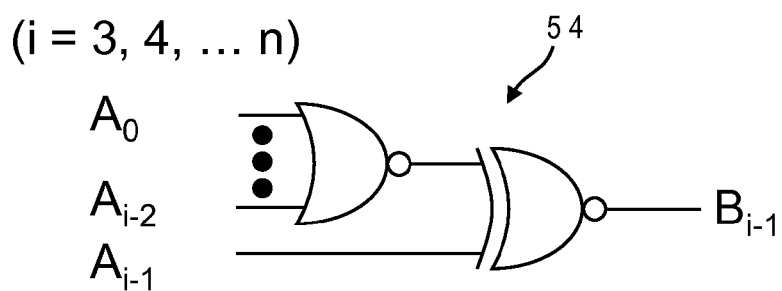
*FIG. 5*
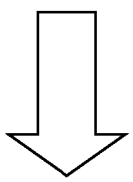
(n = 5, max 3 stages)
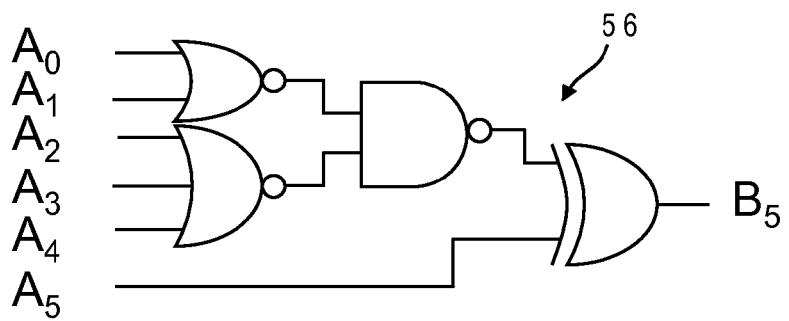

HIGH SPEED AND LOW POWER CIRCUIT STRUCTURE FOR BARREL SHIFTER

CROSS-REFERENCE TO RELATED APPLICATION

This application is a continuation of copending U.S. patent application Ser. No. 13/538,001 filed Jun. 29, 2012.

BACKGROUND OF THE INVENTION

1. Field of the Invention

The present invention generally relates to logic circuits for computational devices, and more particularly to a barrel shifter or rotator.

2. Description of the Related Art

A shifter, or rotator, is a combinational logic circuit that can shift an operand data value by a specified number of places (bits), i.e., move the bits left or right within the data field. Shifters are useful for many computational applications including arithmetic operations, address generation, variable-length coding, and bit indexing, and have become essential to modern integrated circuit devices such as digital signal processors and general-purpose microprocessors.

In the simplest shifter circuit, each bit is incrementally shifted one place at a time, so shifting data by n bits would require n clock cycles. This delay is unacceptable for conventional systems having, e.g., 64-bit or 128-bit data values, so an improved design known as a barrel shifter has been devised which can shift long-bit values in a single clock cycle. Barrel shifters basically trade chip area of the integrated circuit (number of gates) for speed. A barrel shifter relies on a large number of cascaded multiplexers. The minimum number of 2:1 multiplexers required for an n-bit word is n $\log_2$ n; for example, a 64-bit barrel shifter requires 384 multiplexers. One common usage of a barrel shifter is in the hardware implementation of floating-point arithmetic. For a floating-point add or subtract operation, the significands of the two numbers must be aligned, which requires shifting the smaller number to the right and increasing its exponent until it matches the exponent of the larger number. This operation is conveniently accomplished by subtracting the exponents, and using the barrel shifter to shift the smaller number to the right by that difference, in one cycle.

FIG. 1 shows the basic structure of a conventional 64-bit barrel shifter 10. A set of input latches 12 are used to store the operand data and the shift control data for the next shift operation. The shift control data includes a one-bit shift direction signal (shift_right) and a six-bit shift amount signal (shift_amount<0:5>) representing a shift of 0-63 places. The operand data is passed to a formatter and driver 14 which may perform formatting of the data for the multiplexer cascade, and the shift control data is passed to an invert with shift right circuit 16 which generates decoder signals that are later decoded to control the multiplexers. In this design, the multiplexer cascade has two stages wherein an intermediate or coarsely-shifted value (the operand data shifted by some integer multiple of 8) is selected by a first selector 18, and then a fully shifted value (further shifted by 0-7) is selected by a second selector 20 using the output of selector 18. Selector 18 selects one group out of eight groups, each having 72 bits, while selector 20 selects one group out of nine groups, each having 64 bits, due to the encoding inherent in the use of invert with shift right circuit 16. The first set of groups have an extra 8 wrap-around bits appended to the operand data to avoid the data transfer delay penalty incurred by long wiring that would otherwise be required. Invert with shift right circuit 16 generates a decode signal which may be considered as having two halves, a most-significant bit (MSB) half and a least significant bit (LSB) half. The MSB decode bits are used to derive the first selection signal and the LSB decode bits are used to derive the second selection signal, along with the shift_right signal. A first decoder 22 computes the selection signal for selector 18, and a second decoder 24 computes the selection signal for selector 20. Decoder 22 is a three-to-eight decoder, i.e., it receives a 3-bit input and computes an 8-bit output. While decoder 24 may be considered a three-to-nine decoder because it receives a 3-bit input and computes a 9-bit output, it also requires the shift_right input so it is designated as a four-to-nine decoder in FIG. 1. The 64-bit output of selector 20 (raw shifted data) can be further used as an input to a multiplexer and driver 26 to generate final shifted data that is then stored in output latches 28.

SUMMARY OF THE INVENTION

The present invention is generally directed to a barrel shifter which uses a sign magnitude to 2's complement converter circuit to generate decoder signals for two or more cascaded multiplexer selectors. The sign magnitude to 2's complement converter circuit has a sign input which receives an input shift direction and has a magnitude input which receives an input shift amount. In the exemplary embodiment there are two selectors, so the sign magnitude to 2's complement converter circuit generates two decoder signals, and two select signals are derived from the decoder signals using two decoder circuits. The sign magnitude to 2's complement converter circuit can compute an output result as a 2's complement of the input shift amount using a shift direction as a sign input, assign a first portion of the output result to the first decoder signal, and assign a second portion of the output result to the second decoder signal. The encoding scheme using a sign magnitude to 2's complement converter circuit allows the decoder circuits to be relatively simple, for example, 3-to-8 decoders for an implementation adapted to shift a 64-bit operand value rather than the 4-to-9 decoder required in a conventional barrel shifter. For that implementation, the sign magnitude to 2's complement converter circuit can be optimized to generate the decoder signals using no more than three stages of gates. The invention also allows for smaller selector logic, e.g., a first selector which selects one group of 71 bits out of eight groups (as opposed to 72 bits in a conventional barrel shifter) and a second selector which selects one group of 64 bits out of eight groups (as opposed to nine groups in a conventional barrel shifter).

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

FIG. 5 is a set of converter circuits for the sign magnitude to 2's complement converter in accordance with an exemplary embodiment of the present invention;

The use of the same reference symbols in different drawings indicates similar or identical items.

DESCRIPTION OF THE PREFERRED EMBODIMENT(S)

Figure 1:
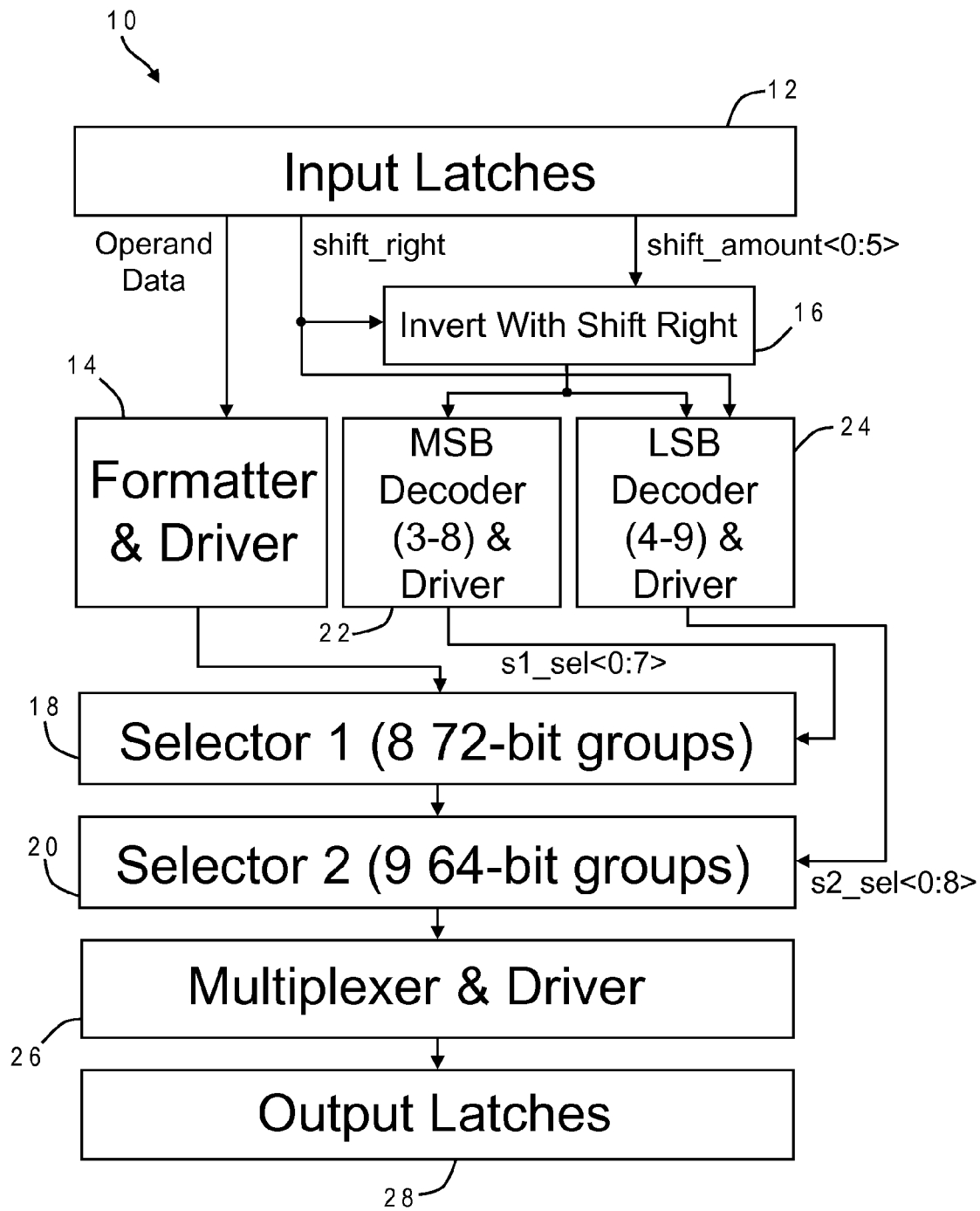
FIG. 1 is a block diagram of a conventional 64-bit barrel shifter which uses cascaded multiplexers to provide variable-length shifting in a single execution cycle.

Barrel shifters (rotators) are extremely valuable for performing variable bit-length shift operations, particularly in execution units of a microprocessor. However, as the number of bits being shifted increases, the period of signal transfer along the horizontal bit direction increases, which can make the processing time of this component considerably large. While cascaded stage selectors can reduce this processing time, they considerably increase the complexity of the decoders and selectors. For example, in the prior art barrel shifter 10 seen in FIG. 1, the first selector 18 is relatively simple since it is a straightforward computation to decode a 3-bit signal into an 8-bit signal, but the second selector 20 requires a 9-to-1 selection that leads to circuit inefficiencies. The LSB decoder 24 must use both the shift direction signal and the decode signal from invert with shift right circuit 16 in a 4-bit adder circuit, and then use the output of the 4-bit adder circuit as an input to a 4-to-9 decoder circuit. This extra layer of circuitry inserts additional delay into the shifter at a timing critical block (the LSB decoder 24).

It would, therefore, be desirable to devise an improved barrel shifter which could minimize or reduce the delay in the timing-critical decoder circuits. It would be further advantageous if the method could allow for a reduction in the number of selector inputs. The present invention achieves these benefits by replacing the invert with shift right circuit with a sign magnitude to 2's complement converter, which leads to more efficient encoding of the selection signals. The design of the sign magnitude to 2's complement converter can further be optimized to avoid any increase of the delay. These improvements contribute to faster operation and reduced area and power, as well as noise immunity improvement. As the number of bits to be shifted increases, the effectiveness of this scheme likewise increases.

Figure 2:
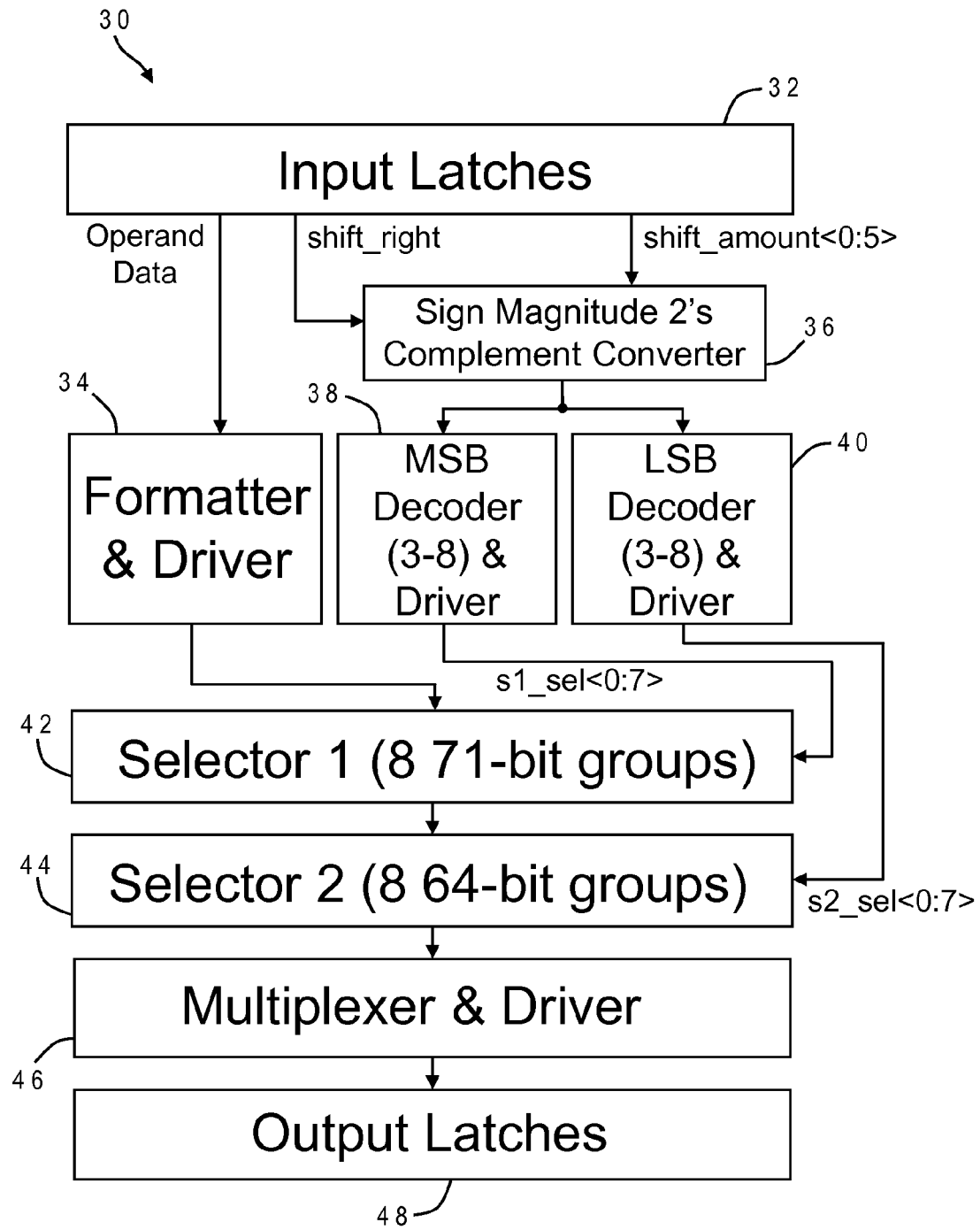
FIG. 2 is a block diagram of one embodiment of a 64-bit barrel shifter constructed in accordance with the present invention which uses a sign magnitude to 2's complement converter to encode the selector signals.

With reference now to the figures, and in particular with reference to FIG. 2, there is depicted one embodiment 30 of an improved barrel shifter constructed in accordance with the present invention. Barrel shifter 30 uses a set of input latches 32 to store the operand data and the shift control data for the next shift operation. The shift control data includes the one-bit shift direction signal (shift_right) and the six-bit shift amount signal (shift_amount<0:5>) representing a shift of 0-63 places. Operand data is passed to a formatter and driver 34 which may perform formatting of the data, and the shift control data is passed to a sign magnitude to 2's complement converter circuit 36 which generates decoder signals that are later decoded to control the cascaded multiplexers. Formatter and driver 34 can be used for an operation which is unrelated to the shifting function of the present invention, that is, for concatenating a 32-bit value to yield a 64-bit value according to a particular processor specification.

Figure 3:
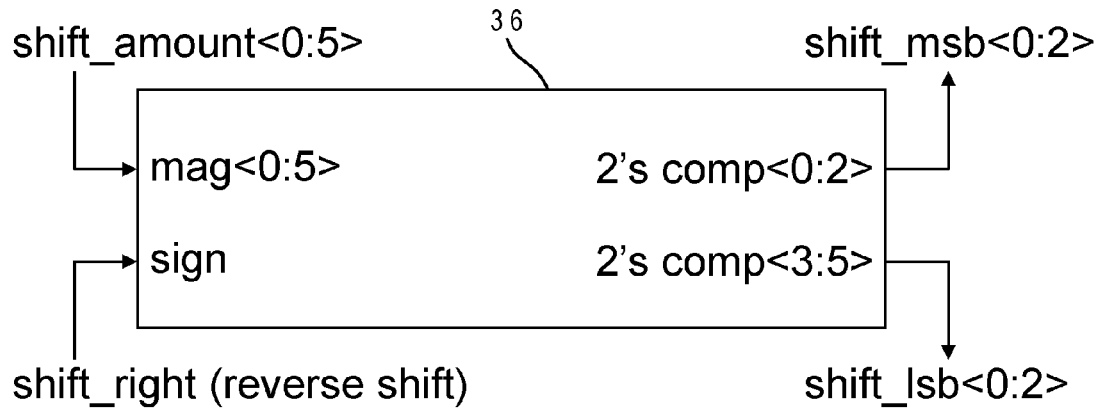
FIG. 3 is a block diagram illustrating the inputs and outputs of the sign magnitude to 2's complement converter used in the barrel shifter of FIG. 2 in accordance with one implementation of the present invention.

As seen in FIG. 3, sign magnitude to 2's complement converter circuit 36 has a 6-bit magnitude input which receives the shift amount signal, and has a single bit sign input which receives the shift direction signal, i.e., the sign magnitude to 2's complement converter circuit uses the shift_right signal in lieu of the sign bit (the shift_right signal is active, or logical high, to indicate a shift to the right direction, and is inactive, or logical low, to indicate a shift to the left direction). The computed result is a 6-bit output (the 2's complement of the shift amount signal); the first three (the most significant) bits of this output are assigned to the decoder signal (shift_msb<0:2>) for a first decoder 38, and the last (the least significant) three bits of this output are assigned to the decoder signal (shift_lsb<0:2>) for a second decoder 40.

Figure 4:
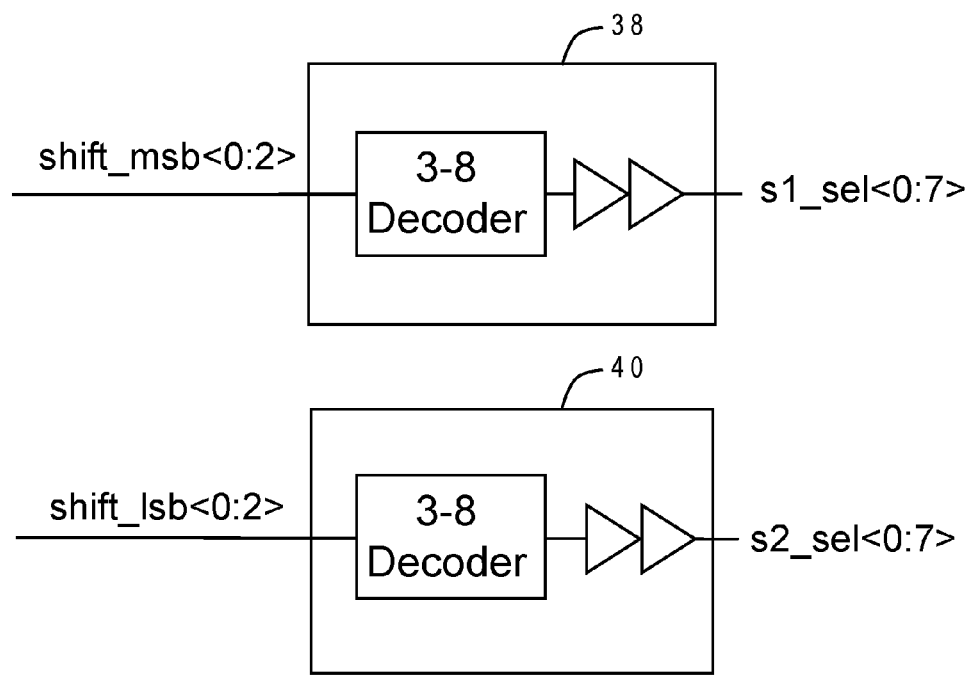
FIG. 4 is a high-level schematic diagram depicting decoding of the encoded signals from the sign magnitude to 2's complement converter into the selection signals that control the multiplexer cascades in accordance with one implementation of the present invention.

As seen further in FIG. 4, the present invention enables a more efficient encoding scheme which requires the decoders 38, 40 to be only simple 3-to-8 decoders, i.e., the two decoders 38, 40 are the same design. Decoder 38 derives a first selection signal (s1_sel<0:7>) to control a first (higher-order) selector 42, and decoder 40 derives a second selection signal (s2_sel<0:7>) to control a second (lower-order) selector 44. In further contrast to the conventional barrel shifter illustrated in FIG. 1, selector 42 selects one group out of eight groups, each having 71 bits, and selector 44 selects one group out of eight groups, each having 64 bits, due to the encoding inherent in the use of the sign magnitude to 2's complement converter 36. Since selector 44 uses only eight input groups (instead of nine), LSB decoder 40 can be greatly simplified over the prior art LSB decoder 24 used in the prior art barrel shifter, leading to significant timing improvement. This approach also reduces the number of transfer gate multiplexers (TG-muxes) for selectors 42, 44. A transfer gate consists of a pair of coupled transistors, one ap-type metal-oxide semiconducting field effect transistor (pMOSFET) and the other an a n-type metal-oxide semiconducting field effect transistor (nMOSFET). The prior art second stage selector is not suited for implementation with a TG-mux because the number of input ports are nine or more. In the TG-mux, only one input port is selected to transfer the data to the output port, so the driver in the selected path has to drive the parasitic capacitance and resistance load for all of the input ports including unselected ports. Driving such a large load with one input driver is especially not suited for advanced technologies which may use a low power supply, e.g., 1.0 volts or less. However, with eight or fewer input ports the use of a TG-mux with such advanced technologies becomes feasible. This scheme additionally increases the noise immunity for the selectors.

FIG. 5 illustrates a set of converter circuits that can be used to implement the sign magnitude to 2's complement converter. For general sign magnitude to 2's complement conversion, if the sign bit is zero (in this implementation, the shift_right signal), then the input value A ($A_5$, $A_4$, ... $A_0$) is used as the output of the sign magnitude to 2's complement converter. But if the sign bit is one (shift_right is high and activated), a computed value B ($B_5$, $B_4$, ... $B_0$) is used as the output of the sign magnitude to 2's complement converter. Accordingly, the converter circuits shown in FIG. 5 are only necessary for this latter circumstance, i.e., shift_right=1, and if shift_right=0 then sign magnitude to 2's complement converter circuit 36 simply passes the shift amount input as the 2's complement output. Circuit 50 is used to generate the first bit $B_0$, and is comprised of two serially connected inverters whose input is $A_0$. Circuit 52 is used to generate the second bit $B_1$, and is comprised of an exclusive OR gate whose inputs are $A_0$ and $A_1$. Circuit 54 is a generalized schematic for generating higher bits of the 2's complement. An exclusive NOR gate receives the highest place bit as an input along with the output of a NOR gate whose inputs are the remaining lower place bits. Circuit 56 is a preferred implementation for generating the sixth bit $B_5$. In this construction, the first two bits of the input $A_0$ and $A_1$ are inputs to a first NOR gate, and the next three bits $A_2$, $A_3$, $A_4$ are inputs to a second NOR gate, and the outputs of these two NOR gates are combined in a NAND gate. The output of this NAND gate is combined with the final input bit $A_5$ in an exclusive OR gate to generate the final 2's complement bit $B_5$. Thus, sign magnitude to 2's complement converter circuit 36 can be implemented with a maximum of three stages of gates, advantageously minimizing the associated delay for generating the decoder signals. Table 1 is a truth table showing the decoder outputs according to this scheme.

TABLE 1

| shift amount | shift left (shift_right = 0) | | | | shift right (shift_right = 1) | | | |
|---|---|---|---|---|---|---|---|---|
| | msb decoder | | lsb decoder | | msb decoder | | lsb decoder | |
| | in | out | in | out | in | out | in | out |
| 000000 | 000 | 0 | 000 | 0 | 000 | 0 | 000 | 0 |
| 000001 | 000 | 0 | 001 | 1 | 111 | 7 | 111 | 7 |
| 000010 | 000 | 0 | 010 | 2 | 111 | 7 | 110 | 6 |
| ... | ... | | ... | | ... | | ... | |
| 000101 | 000 | 0 | 101 | 5 | 111 | 7 | 011 | 3 |
| 000110 | 000 | 0 | 110 | 6 | 111 | 7 | 010 | 2 |
| 000111 | 000 | 0 | 111 | 7 | 111 | 7 | 001 | 1 |
| 001000 | 001 | 1 | 000 | 0 | 111 | 7 | 000 | 0 |
| 001001 | 001 | 1 | 001 | 1 | 110 | 6 | 111 | 7 |
| 001010 | 001 | 1 | 010 | 2 | 110 | 6 | 110 | 6 |
| ... | ... | | ... | | ... | | ... | |
| 111101 | 111 | 7 | 101 | 5 | 000 | 0 | 011 | 3 |
| 111110 | 111 | 7 | 110 | 6 | 000 | 0 | 010 | 2 |
| 111111 | 111 | 7 | 111 | 7 | 000 | 0 | 001 | 1 |

According to the above table, both the msb and lsb decoder outputs range from 0 to 7 for both the "shift left" and "shift right" cases which requires only 8-to-1 selection for both selectors 42, 44. In contrast, the truth table for the decoders of the prior art barrel shifter seen in FIG. 1 provides 9-to-1 selection for the second selector stage, i.e., output values ranging from 0 to 8.

Figure 6:
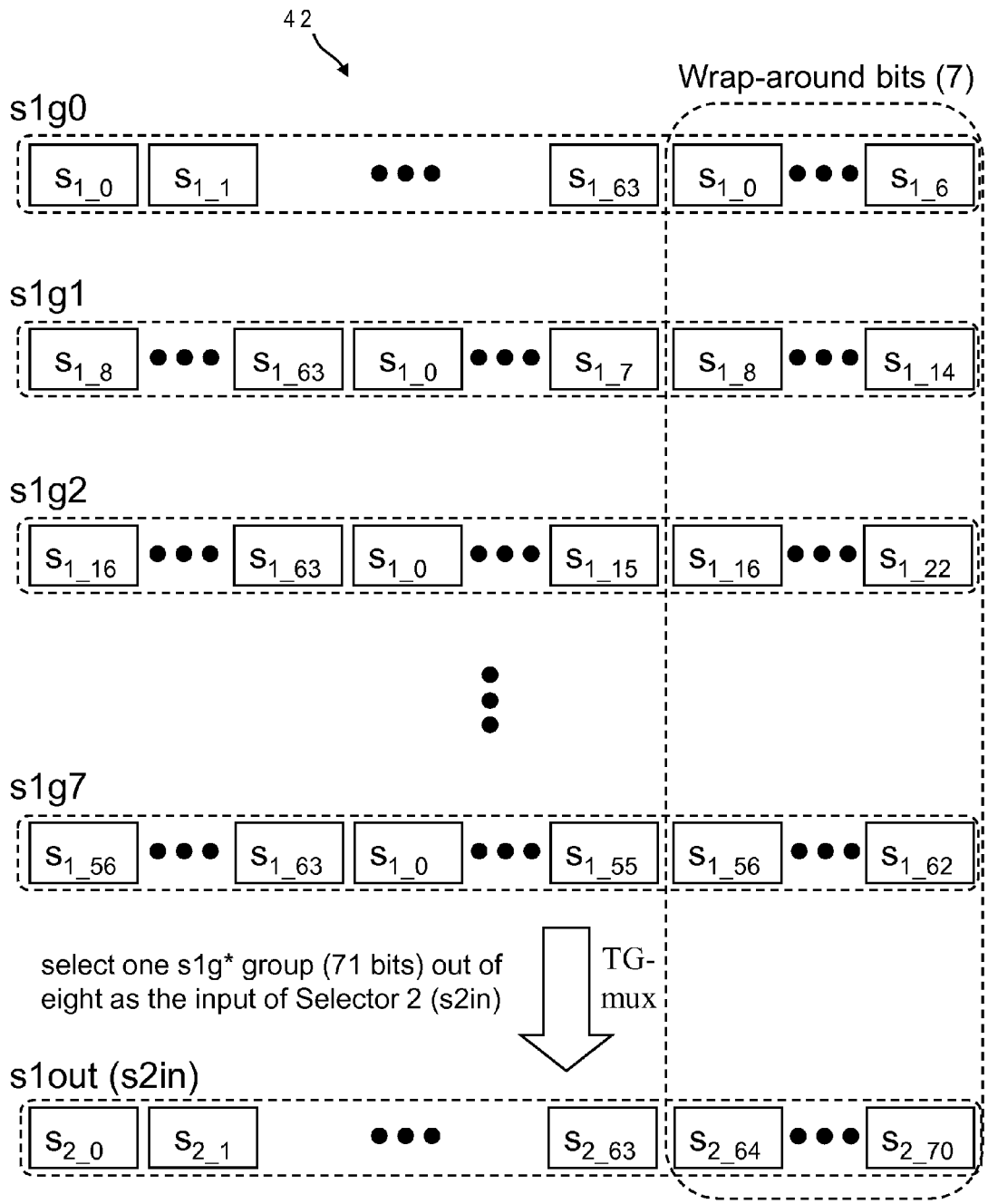
FIG. 6 is a chart illustrating the function of the first (higher-order) selector used in the barrel shifter of FIG. 2 in accordance with one implementation of the present invention.
Figure 7:
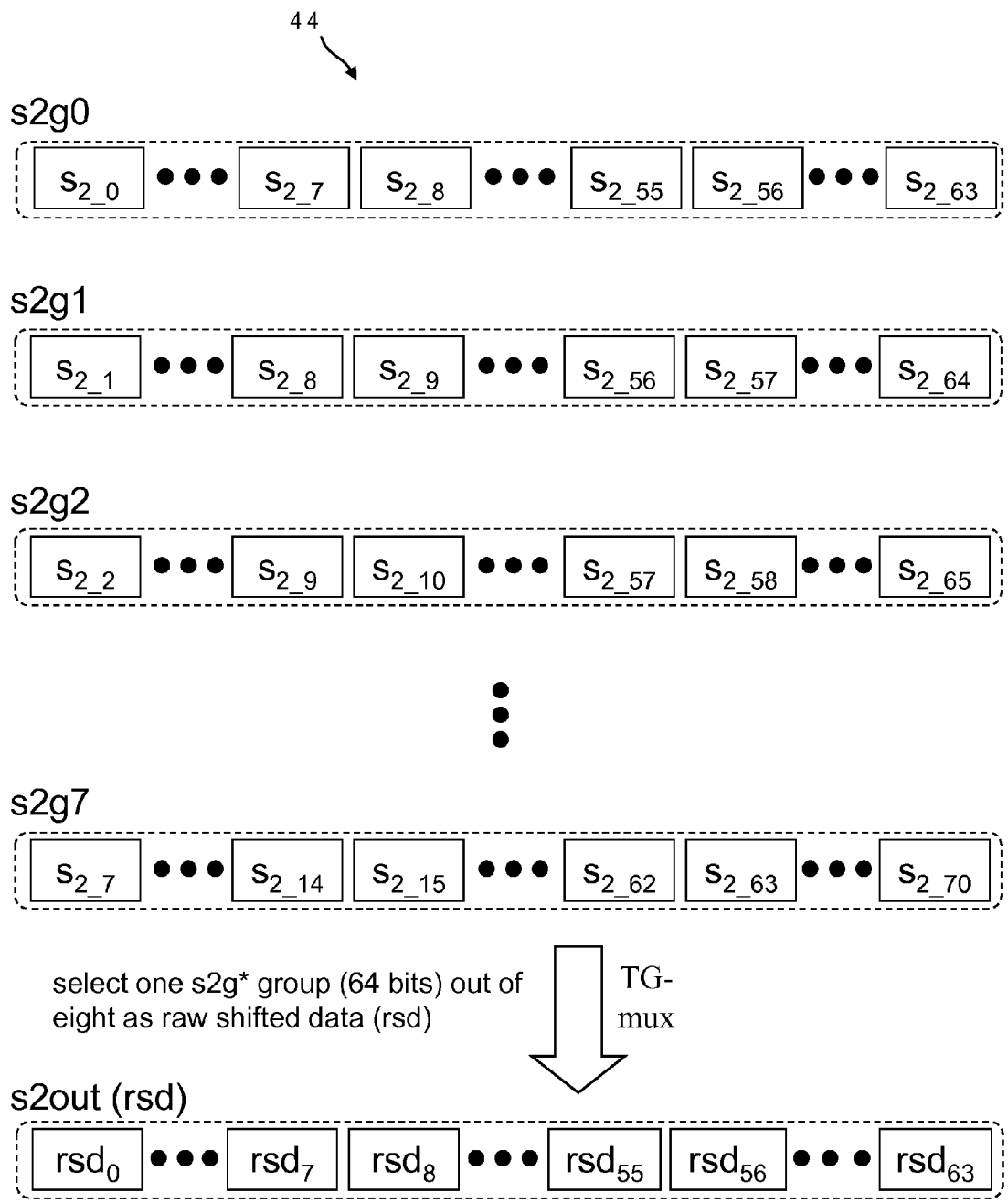
FIG. 7 is a chart illustrating the function of the second (lower-order) selector used in the barrel shifter of FIG. 2 in accordance with one implementation of the present invention.

FIGS. 6 and 7 depict the function of selectors 42 and 44, respectively. Selector 42 receives the 64-bit pre-shifted operand data from formatter 34, and as seen in FIG. 6 creates eight different groups (s1g0 through s1g7) each containing 71 bits, including the original 64 bits and the left side 7 bits appended to its right side as wrap-around bits (again provided to avoid the data transfer delay penalty incurred by long wiring that would otherwise be required). The multiplexer array within selector 42 provides for intermediate shifting of each group by some integer multiple of a first shift level (higher-order) amount. In this implementation, the first shift level unit amount is 8, so the first group s1g0 is unshifted (i.e., shifted by 0×8 bits) beginning with the most significant bit of the input operand data $s_{1\_0}$ and ending with the last of the wrap around bits $s_{1\_6}$, the second group s1g1 is shifted by 8 places (1×8) ranging from $s_{1\_8}$ to $s_{1\_14}$, etc., until the last (eighth) group is shifted by 56 places (7×8) ranging from $s_{1\_56}$ to $s_{1\_62}$. The output group (s1out) selected by selector 42 based on the first select signal then becomes the input group (s2in) for selector 44 (71 bits, designated $s_{2\_0}$ to $s_{2\_70}$).

Selector 44 receives the 71-bit data from selector 42, and as seen in FIG. 7 creates eight different groups (s2g0 through s2g7) each containing 64 bits. The multiplexer array within selector 44 provides for refined shifting of each group by some integer multiple of a second shift level (lower-order) amount, which is smaller than the first shift level amount. In this implementation, the second shift level unit amount is 1, so the first group s2g0 is again unshifted (0×1) ranging from $s_{2\_0}$ to $s_{2\_63}$, the second group is shifted by 1 place (1×1) ranging from $s_{2\_1}$ to $s_{2\_64}$, etc., until the last (eighth) group is shifted by 7 places (7×1) ranging from $s_{2\_7}$ to $s_{2\_70}$. The output group (s2out) selected by selector 44 based on the second select signal then becomes the raw shifted data (rsd) for rotator 30 (64 bits, designated $rsd_0$ to $rsd_{63}$). The raw shifted data from selector 44 may further be provided as an input to multiplexer and driver 46 to generate final shifted data that can be stored in output latches 48. Multiplexer and driver 46 can be used for another operation which is not directly related to the shifting function of the present invention, that is, for shifting a different operand again according to a particular processor specification; this optional function does not affect the timing of the barrel shifter operation.

Those skilled in the art will recognize that the two selectors 42, 44 with their corresponding shift level unit amounts (8 and 1) represent different levels of a hierarchical design for implementing a cascaded barrel shifter. Accordingly, other implementations of a barrel shifter based on the present invention may have a different hierarchy in which case the numbers of bits in the decoder signals, the number of selector stages, the number of groups created by the selectors, or the shift level unit amounts may vary from the disclosed embodiments. For example, a 64-bit shifter could alternatively be implemented in three stages each using a two-bit decoder signal, with shift level unit amounts of 16, 4 and 1 (four groups to select from at each selector stage). As a further example, a 512-bit rotator could also be implemented in three stages with each stage using a 3-bit decoder signal and shift level unit amounts of 64, 8 and 1 (eight groups to select from at each selector stage). In each of these alternative designs, the decoder signals are still generated by a sign magnitude to 2's complement converter. Thus, the specific details for the disclosed implementation 30 of a barrel shift are exemplary only, and should not be construed in a limiting sense.

Figure 8:
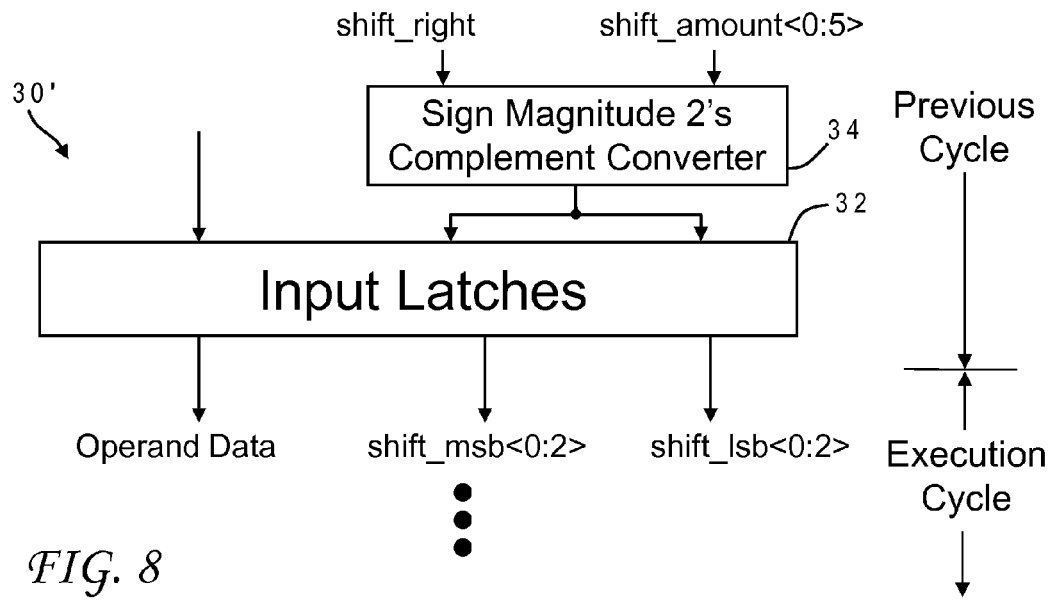
FIG. 8 is a block diagram showing the front end for an alternative implementation of a barrel shifter in accordance with one implementation of the present invention.

FIG. 8 illustrates a further alternative embodiment 30' for a 64-bit barrel shifter which differs from barrel shifter 30 only in the relative placement of the sign magnitude to 2's complement converter circuit 36 and input latches 32. In this alternative embodiment the 2's complement conversion occurs in the previous cycle and the decoder signals shift_msb<0:2> and shift_lsb<0:2> are placed in the input latches 32 along with the operand data. In this manner pipelined operations within shifter 30' can execute even faster since the encoding stage is placed outside of the execution cycle.

Figure 9:
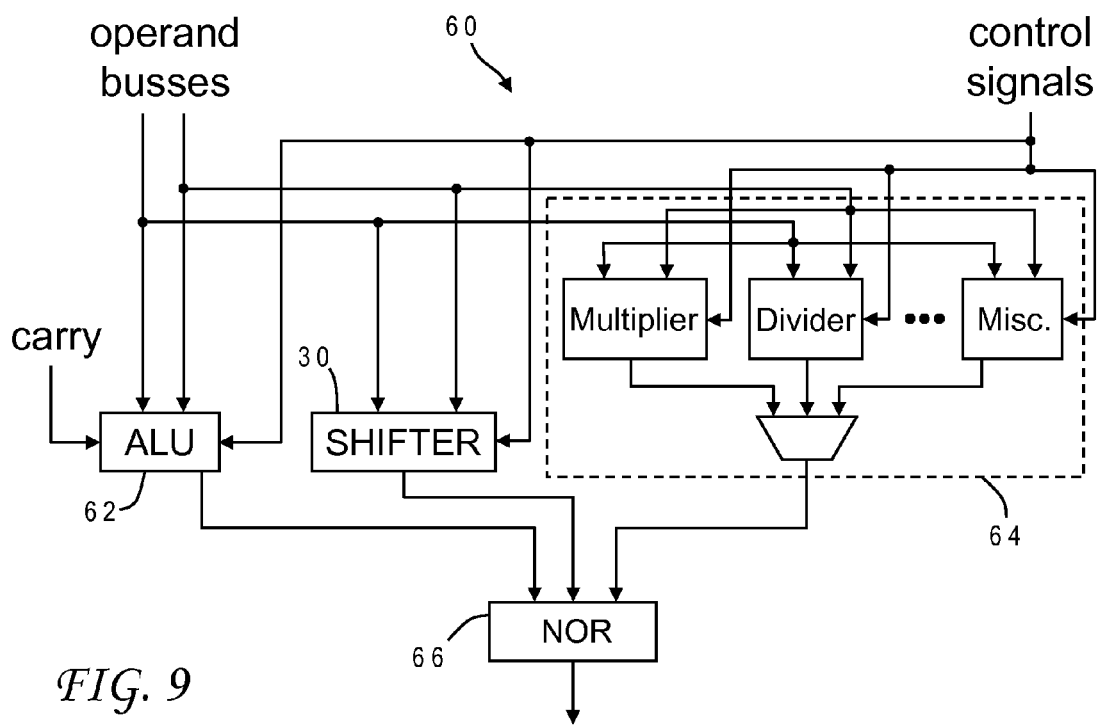
FIG. 9 is a block diagram of an application for the barrel shifter of FIG. 2 in conjunction with an arithmetic logic unit and other execution units of an integrated circuit microprocessor in accordance with one implementation of the present invention.

The barrel shifter of the present invention may be used in a wide variety of applications which require shifting or rotation, and is particularly useful within execution units of a microprocessor. One particular application shown in FIG. 9 is an execution unit 60 which includes the barrel shifter 30, an arithmetic logic unit (ALU) 62, and a multi-cycle operation block 64. Barrel shifter 30 receives the operand data and the control data from two operand busses and control signal lines, which are also connected to ALU 62 and multi-cycle operation block 64. ALU 62 additionally receives a carry signal as is known in the art. ALU 62 is used for logical, arithmetic and compare operations. Shifter 30 and ALU 62 are implemented as single-cycle operation blocks because they are often called most frequently from program code. Other operations can be carried out by multi-cycle operation block 64, such as counting the number of zero or nonzero bits in the operand or a miscellaneous operation defined by a particular instruction set. The outputs of shifter 30, ALU 62 and multi-cycle operation block 64 are connected to the input ports of a 3-way NOR gate 66, and the outputs are tied to "0" by the control signals when the given component is not selected for operation, so the output of NOR gate 66 is the output of the chosen component 30, 62 or 64 according to the particular operation being executed. Execution unit 60 is only one example for utilizing the barrel shifter of the present invention, and those skilled in the art will appreciate that it may be utilized in many other applications including for example within an ALU instead of outside the ALU as seen in FIG. 9.

The present invention accordingly imparts several advantages over prior art barrel shifters. The use of the sign magnitude to 2's complement encoding allows not only for faster operation, but also requires less area of the integrated circuit (fewer gates), and thus leads to reduced power consumption. High speed operation can be achieved even for timing critical cases such as used in a one-cycle operation path. These benefits of the present invention are further amplified as the number of bits increases.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of shifting bits of an operand value comprising:

generating a first decoder signal and a second decoder signal using a sign magnitude to 2's complement converter circuit having a sign input which receives an input shift direction and having a magnitude input which receives an input shift amount;

deriving a first select signal from the first decoder signal using a first decoder circuit;

deriving a second select signal from the second decoder signal using a second decoder circuit;

selecting an intermediate shifted value from a first plurality of shifted values representing the operand value shifted by different integer multiples of a first shift level unit amount using a first selector controlled by the first select signal; and selecting a raw shifted value from a second plurality of shifted values representing the intermediate shifted value shifted by different integer multiples of a second shift level unit amount using a second selector controlled by the second select signal, wherein the operand value has 64 bits, the first decoder signal has 3 bits, the second decoder signal has 3 bits, the first plurality of shifted values comprise eight shifted values each having 71 bits, and the second plurality of shifted values comprise eight shifted values each having 64 bits.

2. The method of claim 1 wherein said generating includes computing an output result as a 2's complement of the input shift amount using the shift direction as a sign input, assigning a first portion of the output result to the first decoder signal, and assigning a second portion of the output result to the second decoder signal.

3. The method of claim 1 wherein the sign magnitude to 2's complement converter circuit generates the first and second decoder signals using no more than three stages of gates.

4. The method of claim 1 wherein the input shift direction has a logical high value to indicate a shift direction to the right, and has a logical low value to indicate a shift direction to the left.

5. The method of claim 1 further comprising converting the raw shifted data into final shifted data using an output multiplexer.

\* \* \* \* \*